Figure 1:
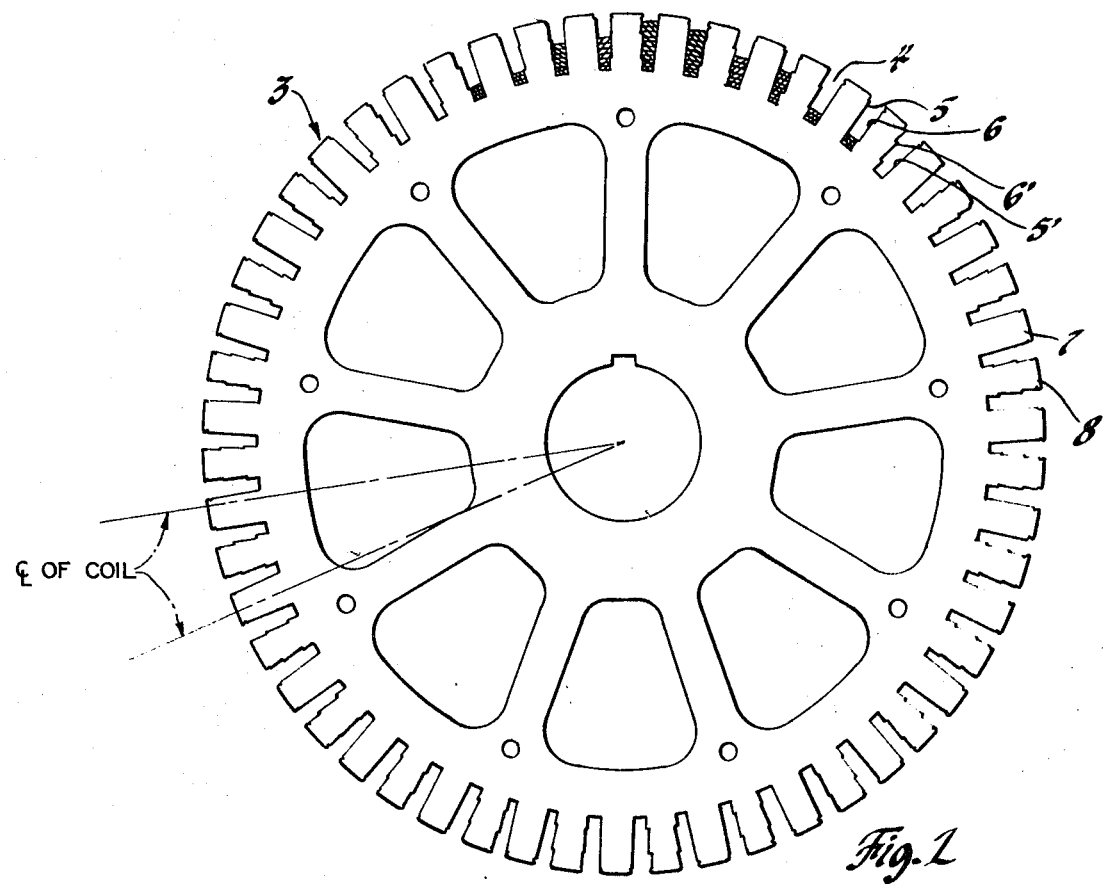

United States Patent

[11] 3,600,618

[72] Inventors Gordon J. Nicholas
   Naperville;
   Edward P. Kupka, LaGrange, both of, Ill.
[21] Appl. No. 869,533
[22] Filed Oct. 27, 1969
[45] Patented Aug. 17, 1971
[73] Assignee General Motors Corporation
   Detroit, Mich.

[54] WOUND ROTOR ALTERNATOR COIL SLOT CONSTRUCTION
   3 Claims, 2 Drawing Figs.
[52] U.S. Cl. .................................................... 310/216,
   310/193
[51] Int. Cl. .................................................... H02k 1/06

[50] Field of Search............................................ 310/216,
   214, 218, 261, 264, 265, 180, 179, 211, 212, 184,
   193

[56] References Cited
   UNITED STATES PATENTS
   565,647   8/1896   Thomson et al. .............. 310/265
   1,147,107 7/1915   Ljungstrom .................. 310/214
   1,571,914 2/1926   Fletcher ...................... 310/264
   1,699,150 1/1929   Maxwell ...................... 310/212

Primary Examiner—D. F. Duggan
Attorneys—F. J. Soucek and C. R. Engle

ABSTRACT: A lamination for a dynamoelectric machine wherein the slots include a pair of sides, one of which sides is straight and the other of which is stepped. The slots are so designed to receive a prewound coil.

PATENTED AUG 17 1971    3,600,618

INVENTORS.
Gordon I. Nicholas &
BY  Edward P. Kupka
F. J. Soucek
ATTORNEY

WOUND ROTOR ALTERNATOR COIL SLOT CONSTRUCTION

The subject invention is generally directed to laminations for dynamoelectric machines and, more particularly, directed to the slots formed in the laminations of rotors for high frequency alternators.

It is common practice to make laminations for dynamoelectric machines with radial slots or parallel slots. In the event radial slots are employed, the windings may be either prewound and formed to accommodate the slots or wound within the slots. If the coils are prewound they must be deformed by spreading and twisting to get them into the slots. This makes the coil difficult to install and could destroy the coil insulation as the coil slides into the slot. Coils that are wound in the slots require more time and labor and, therefore, increase the cost of winding the rotor of the machine.

When parallel slots are employed the coil can be formed on a simple coil forming machine and easily installed on the rotor. The disadvantage of this design, however, is that alternate teeth have different dimensions. For example, one tooth will have a narrower base than an alternate tooth. This results in a magnetic flux concentration at the narrow base. This flux concentration is undesirable because it results in iron loss and further requires a predetermined coil construction to assure that the magnetic pole is substantially parallel to the pole of the coil.

It is therefore, an object of the present invention to provide adjacent poles between coils that are approximately equal to the winding pole in the center of the coil and, accordingly, eliminate the disadvantage of the high flux density dimension between coils.

A further object is to provide means for forming a coil on a coil winding machine, which coil can be assembled on a workbench prior to installation on rotor laminations.

An additional object is to provide a slot configuration wherein prewound coils will slide straight into a slot without subjecting the insulation of the coil to damage.

A final object is to provide an electrical designer with a further basic-type coil and slot form which can be used to obtain an optimum electrical design.

Figure 2:
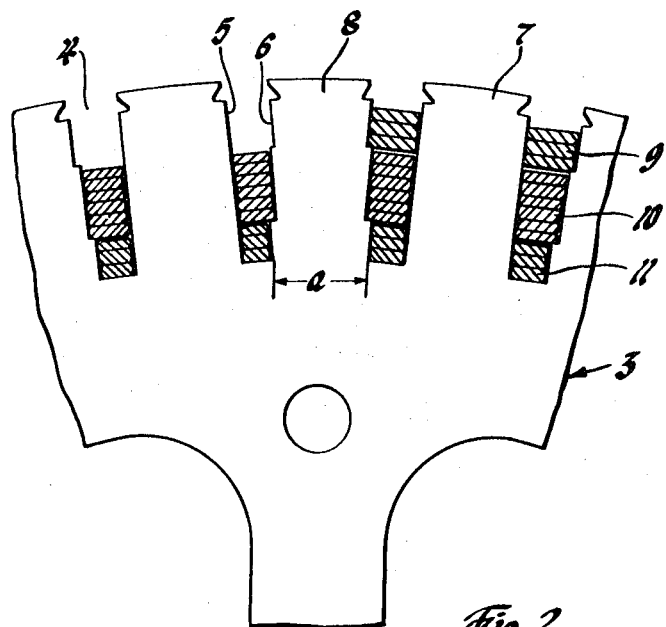

The above and other objects will become more apparent from the following specification when read in conjunction with the drawing wherein:

FIG. 1 illustrates a lamination made in conformance with the present invention; and FIG. 2 is a partial view partly in section of FIG. 1.

Referring now to FIG. 1, a lamination 3 is provided with slots 4 having a first straight side 5 and a second stepped side 6. An adjacent slot of the lamination has a straight side 5' and a third slot adjacent the second slot has a stepped side 6'. It is thus seen that lamination 3 has slots 4 that include a first straight side 5 and a second stepped side 6. The slots 4 define alternate teeth, one tooth 7 having substantially straight sides and the adjacent tooth 8 having stepped sides with the vertical portions of the stepped sides being substantially parallel to straight sides.

The windings 9, 10 and 11, illustrated in FIG. 2, may be prewound and may be inserted into the slots without damage to insulation. Depending upon the design of the dynamoelectric machine, any number of windings may be employed. Such windings and the method of constructing them are disclosed in a corresponding application, Ser. No. 869,680 filed Oct. 27, 1969.

It should be noted that the present invention provides several advantages over previously designed laminations. For example, the designer can choose one or more steps of the slots so that he can approximate an equivalent parallel pole designed by choosing a desired number of steps. This is indicated in FIG. 1 which shows that the adjacent pole between coils is approximately equal to the winding pole in the center of the coil. In FIG. 2 the adjacent pole passes through the dimension "a." This eliminates the disadvantage of high flux density dimension between coils.

By the construction disclosed in the present invention, more flexibility is given to the electrical designer to design a dynamoelectric machine of varying characteristics.

We claim:

1. A lamination for dynamoelectric machine comprising a substantially circular stamping having slots extending inwardly from the outer periphery thereof, said slots defining teeth on said lamination, said teeth being of alternate configuration, one of said teeth having substantially parallel sides and, the other of said teeth having stepped sides.

2. A lamination for a dynamoelectric machine as defined by claim 1 wherein the vertical sides of said other of said teeth are substantially parallel to the sides of said one of said teeth.

3. A lamination for a dynamoelectric machine as defined by claim 1 wherein the inner widths of said alternate teeth are substantially equal.